United States Patent
Welch et al.

(10) Patent No.: US 6,732,662 B2
(45) Date of Patent: May 11, 2004

(54) REMOVABLE TRAY AND TRAY RACKING SYSTEM

(75) Inventors: Robert J. Welch, Dallas, PA (US); Joseph R. Petcavage, White Haven, PA (US); Rakesh T. Patel, Wilkes-Barre, PA (US); Robert K. Swartz, Dallas, PA (US)

(73) Assignee: Metro Industries, Inc., Reno, NV (US)

( * ) Notice: Subject to any disclaimer, the term of this patent is extended or adjusted under 35 U.S.C. 154(b) by 15 days.

(21) Appl. No.: 09/925,656

(22) Filed: Aug. 10, 2001

(65) Prior Publication Data

US 2003/0106473 A1 Jun. 12, 2003

(51) Int. Cl.⁷ .................................................. A47B 9/00
(52) U.S. Cl. ............. 108/109; 108/147.16; 211/126.15; 312/334.44
(58) Field of Search .................... 108/108, 109, 108/110, 189, 144.11, 147.11, 147.16, 147.17; 211/126.1, 126.15, 126.2, 133.2; 312/322, 323, 330.1, 334.44, 402, 408, 410

(56) References Cited

U.S. PATENT DOCUMENTS

| | | | | |
|---|---|---|---|---|
| 1,164,344 A | * | 12/1915 | Habein | 211/126.15 |
| 2,466,033 A | * | 4/1949 | Martin | 312/323 |
| 2,918,342 A | * | 12/1959 | Tarte, Jr. | 312/348.3 |
| 3,534,866 A | * | 10/1970 | Asenbauer | 211/126.2 |
| 3,606,513 A | * | 9/1971 | Hoffmann et al. | 211/126.15 |
| 3,655,063 A | * | 4/1972 | Landry | 211/126.15 |
| 4,004,819 A | * | 1/1977 | Brongo | 211/181.1 |
| 4,138,504 A | * | 2/1979 | Mack et al. | 426/520 |
| 4,232,789 A | * | 11/1980 | Springer | 211/126.15 |
| 4,570,806 A | * | 2/1986 | Dushenko et al. | 211/126.15 |
| 4,725,066 A | * | 2/1988 | Nootenboom et al. | 211/126.15 |
| 5,004,304 A | * | 4/1991 | Segerpalm et al. | 312/201 |
| 5,263,595 A | * | 11/1993 | Hilstolsky | 211/126.15 |
| 5,266,272 A | * | 11/1993 | Griner et al. | 211/126.1 |

FOREIGN PATENT DOCUMENTS

| | | | | |
|---|---|---|---|---|
| EP | 160885 | * | 11/1985 | |
| EP | 446452 | * | 9/1991 | |
| EP | 558909 | * | 9/1993 | |
| GB | 2242350 | * | 10/1991 | ............ 312/334.44 |
| JP | 2001314252 | * | 11/2001 | |

* cited by examiner

Primary Examiner—Lanna Mai
Assistant Examiner—Hanh V. Tran
(74) Attorney, Agent, or Firm—Fitzpatrick, Cella, Harper & Scinto

(57) ABSTRACT

A tray includes a compartment with a bottom surface and perimeter sidewalls, and a passive stop arrangement is provided in the compartment. The passive stop arrangement includes at least a first notch in one of the sidewalls and a stop disposed proximate to the first notch. The tray is especially useful in a tray support system including a chassis having at least two laterally-spaced and vertically oriented racks each having spaced rungs in a mirror-image relationship.

44 Claims, 7 Drawing Sheets

REMOVABLE TRAY AND TRAY RACKING SYSTEM

FIELD OF THE INVENTION

The present invention relates generally to racking systems. More particularly, the present invention relates to an improved tray and tray racking system for supporting at least one removable tray and allowing drawer-like movement of the tray within the racking system.

Although the removable tray and tray racking system is ideally suited for commercial use such as for holding electronic components, it may be used with equal advantage in many other commercial, industrial and residential applications and environments.

BACKGROUND

The utility of formed-wire shelving systems is known. Such systems have found wide use in commercial, industrial, and residential applications. For example, U.S. Pat. Nos. 3,424,111, 3,523,508 and 3,757,705, disclose wire shelving units that have achieved great commercial success under the trademark SUPER ERECTA SHELF by Intermetro Industries Corporation of Wilkes-Barre, Pa.

In U.S. Pat. No. 3,523,508, for example, a modular adjustable shelving system includes a formed-wire shelf component having a frusto-conically-shaped collar at each corner for receiving a support post. Generally cylindrical support posts, each having a plurality of uniformly spaced annular grooves formed in its outer surface, are secured to the shelf by means of a mounting assembly. Each mounting assembly comprises at least two separate, complementary, conical-shaped mounting members which are joined about, and at least partially surround, the support posts to define a sleeve.

U.S. Pat. No. 3,757,705 discloses an adjustable shelving system similar to that U.S. Pat. No. 3,523,508.

Formed-wire shelving systems such as those disclosed in the Maslow patents are commonly known as being of the "knockdown" type. The shelves of knockdown shelving systems are readily adjusted to various desired heights and such systems are readily assembled and/or disassembled.

U.S. Pat. No. 5,263,595 to Hilstoky discloses a modular formed-wire shelving system for use with removable pans. The Hilstoky system comprises a base frame, a top frame, and a pair of opposed vertical support assemblies. Each vertical support assembly comprises a plurality of spaced vertical support rods and a plurality of spaced horizontal support brackets secured to the vertical support rods at points where they intersect each other. At least two of the vertical support rods engage and interlock with the base and top frames. The plurality of support brackets are arranged in substantially co-planer pairs to cooperatively support removable pans between the vertical support assemblies. Further, at least one pair of vertical support rods are positioned in the vertical support assemblies so as to be disposed on either side of, and proximate to, the sidewalls of the inserted pans so as to limit lateral side-to-side movement of the pans to prevent them from slipping off the support brackets.

Additionally, other prior art rack systems employ a second set of spaced brackets to prevent tipping of the supported trays. Typically, these second brackets are located between the first supporting brackets of a vertical support assembly in a position above the tray. The second brackets are configured to extend laterally inwardly beyond the sidewalls of the tray so that, as a tray begins to tip, the tray contacts the second brackets and remains in a substantially level orientation.

Wire shelving systems, like the one disclosed in the Hilstoky patent above, are readily adaptable for storing and supporting trays and the like which, in turn, are capable of supporting a wide array of items, such as food items, boxes, tools, etc. There is a need, however, for a removable tray and racking system that provides advantages heretofore unknown. For example, individual trays could be inserted and removed from the system but could also be partially drawn like a drawer so that the contents of the tray may be inspected and accessed. Such a "passive stop" feature would also help prevent inadvertent removal of the trays. Such a system should also allow users to identify the trays in the rack before withdrawal to minimize unnecessary handling of the trays.

SUMMARY OF THE INVENTION

It is an object of the present invention to improve upon shelving and racking systems known in the prior art.

It is another object of the present invention to provide a tray racking system that is adapted to provide drawer-like retention of the trays.

In one aspect of the present invention, a tray includes a compartment having a bottom surface and perimeter sidewalls, and a passive stop arrangement provided in the compartment. The passive stop arrangement includes at least a first notch in one of the sidewalls and a stop disposed proximate to the first notch.

In another aspect of the present invention, a tray support system comprises a chassis for supporting at least one removable tray, with the chassis including at least two laterally-spaced and vertically-oriented racks, each having spaced rungs in a mirror-image relationship.

In another aspect of the present invention, a sliding tray assembly is adapted to be retained within a chassis dimensioned and configured for slidably receiving, supporting, and spacedly stacking a plurality of removable trays and the like, one above the other between a pair of laterally-spaced and vertically-oriented racks having rungs. The tray assembly comprises a tray capable of supporting items and a passive stop means for stopping sliding movement of the tray relative to the chassis.

In still another aspect of the present invention, a tray support system comprises a chassis having guide means to guide at least one tray at least partially disposed within the chassis and a tray having passive stop means to stop lateral movement of the tray.

These and other aspects, objects and features of the present invention will become apparent from the following detailed description of the preferred embodiments of the present invention, read in conjunction with reference to the accompanying drawings.

DETAILED DESCRIPTION

Initially, for purposes of explanation, the attitude and location of components of the tray shelving system of the present invention will be defined with reference to a fully assembled system as viewed in normal use. Therefore, the term "horizontal," as used herein, refers to a direction parallel to a surface on which the fully assembled system is supported in normal use. Similarly, as used herein, the term "vertical" refers to a direction substantially normal to the horizontal direction. Further, the term "base" refers to the bottom of the system closest to the surface on which the system is supported, while the term "top" refers to the end opposite the base. The "front" and "rear", "left side" and "right side" of the system are relative terms as will be defined below.

Figure 1:
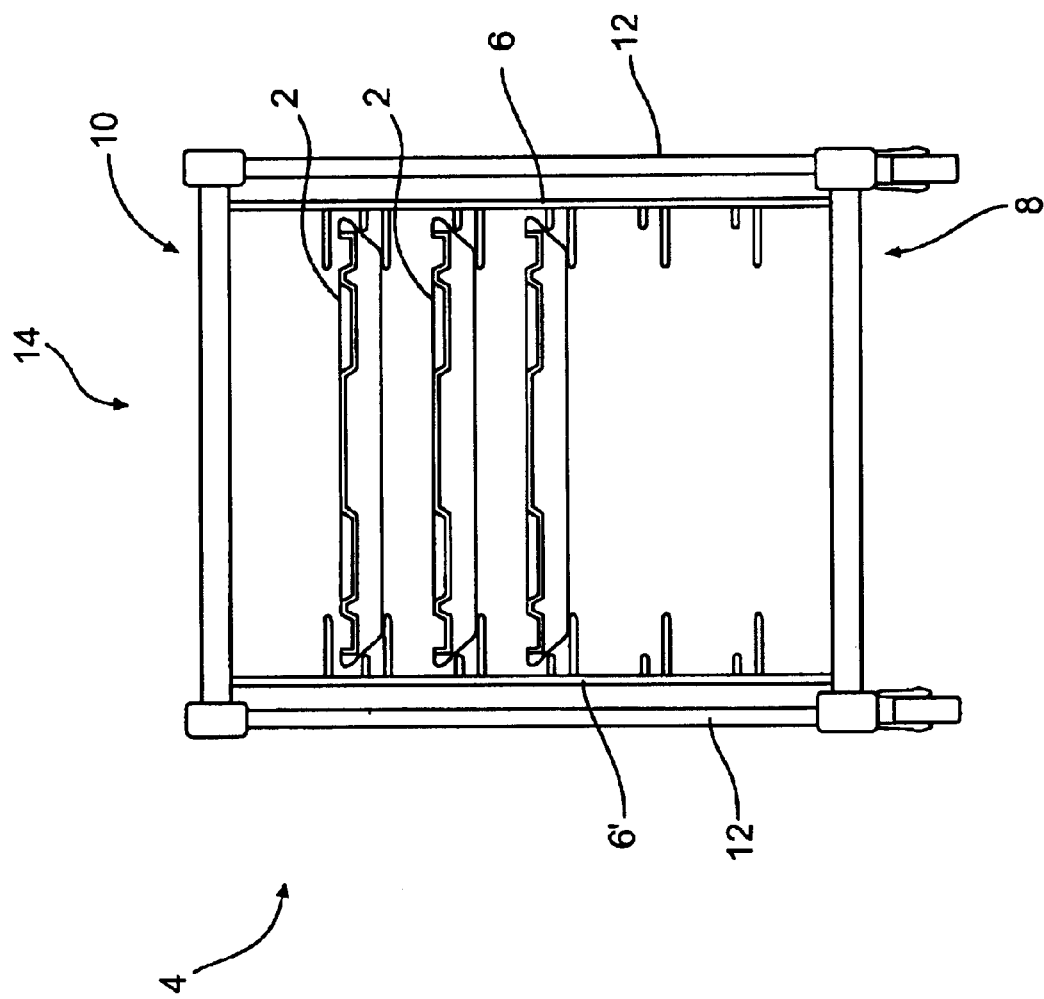
FIG. 1 is a front elevational view of a cart employing an assembled racking system in accordance with a preferred embodiment of the present invention.

Turning to FIG. 1, the system of the present invention is shown to include a plurality of trays 2, supported in a spacedly stacked configuration within a cart 4 between a pair of vertically-oriented racks 6 and 6'. The trays, as will be described in detail below with reference to FIG. 2, have a bottom surface and perimeter sidewalls extending upwardly from the bottom surface to form a compartment. As will also be explained in detail below with reference to FIG. 3, not only are the trays removably and slidably supported in the racks, the trays include structure to passively stop lateral front-to-back movement of the tray within the racks.

While the cart will be described in detail below with reference to FIGS. 4–6, it generally comprises a base assembly 8, a top assembly 10, support posts 12 located at, and extended between, the corners of the base and top assemblies, and the racks 6, 6'. Although only two support posts are visible in FIG. 1, the cart includes four such posts, one at each corner. The base assembly, the top assembly, and the support posts comprise a chassis 14 to which the racks are fixedly supported.

Figure 2:
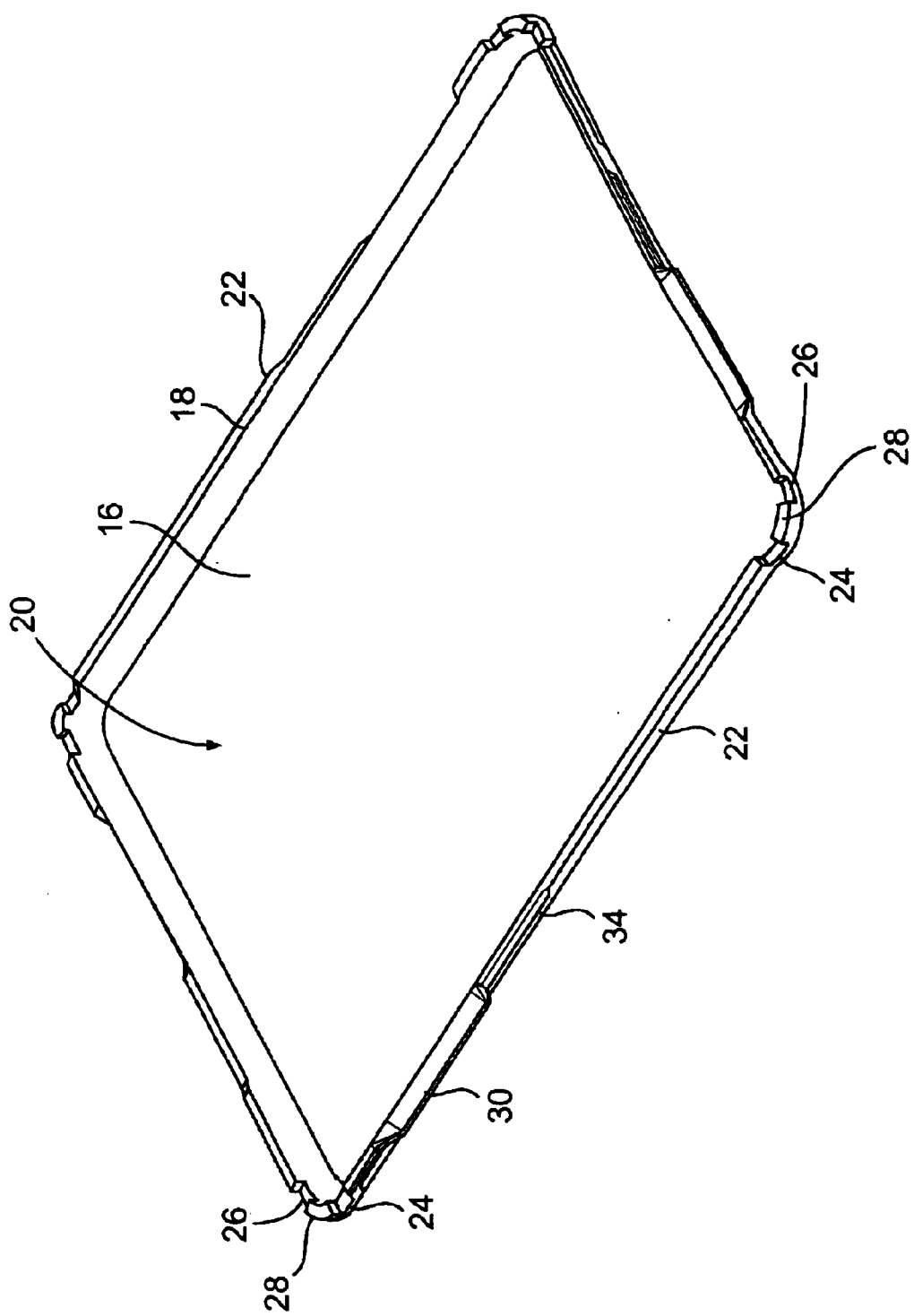
FIG. 2 is a perspective view of a removable tray constructed in accordance with a preferred embodiment of the present invention for use with the shelving system shown in FIG. 1.

Referring now to FIG. 2, there is shown a tray 2 of a preferred embodiment of the present invention. As each tray is identical, the following discussion will be limited to a single tray. The tray is generally rectangular in shape and has a relatively long dimension running along the left and right sides, and a relatively short dimension running along the front and back of the tray. A typical tray may be 18" by 26". Of course, many other sizes are possible. The rectangular shape is advantageous since readily available, commercial trays also are generally rectangular. Thus, the tray may, in addition to being used as part of the present invention, be used with other devices configured for such commercial trays. Also, the tray of the present invention may be stacked atop each other as well as with such conventional trays for efficient storage.

The tray 2 includes a relatively flat bottom surface 16 and sidewalls 18 extending generally upwardly from the bottom surface. The bottom surface and the sidewalls form a compartment generally designated by reference character 20.

The sidewalls 18 of the tray 2 are preferably integrally formed with the bottom surface 16 of the tray. The sidewalls have a flange 22 and extend generally vertically upward and slightly outward from the bottom surface of the tray such that the flange is disposed outside of, yet parallel to, the bottom surface. The height of the sidewalls determines the depth of the compartment for supporting workpieces in the tray. As one skilled in the art will appreciate, the exact dimension of the sidewalls may be varied but is preferably of sufficient height that the compartment formed by the bottom surface and the sidewalls is well suited for supporting items such as, for example, electronic components.

The flanges 22 of the sidewalls 18 have discontinuities near each corner of the tray thereby forming a plurality of first notches 24 and a plurality of second notches 26. The first notches 24 are located on the left and right sides of the tray proximate to its corners. The second notches 26 are located along the front and back sides of the tray proximate to its corners. The notches preferably share the same dimensions. In a manner discussed in detail below, the notches are dimensioned to, when the tray is tilted such that the flange contacts the rungs immediately above it, either receive elbows of the rungs above the tray or to accept, and guide the tray along, portions of the rungs above the tray.

The first notches 24 and the second notches 26 at each corner of the tray are separated by a stop 28 formed in the sidewalls 18. As FIG. 2 illustrates, the stop is disposed between the adjacent notches and preferably shares the height, orientation and flange of the sidewall, of which it is part. However, the stop may take on other dimensions so long as it is able, in a manner discussed in detail below, to reliably engage and disengage the rungs immediately above the tray and permit stacking of the tray.

Figure 3:
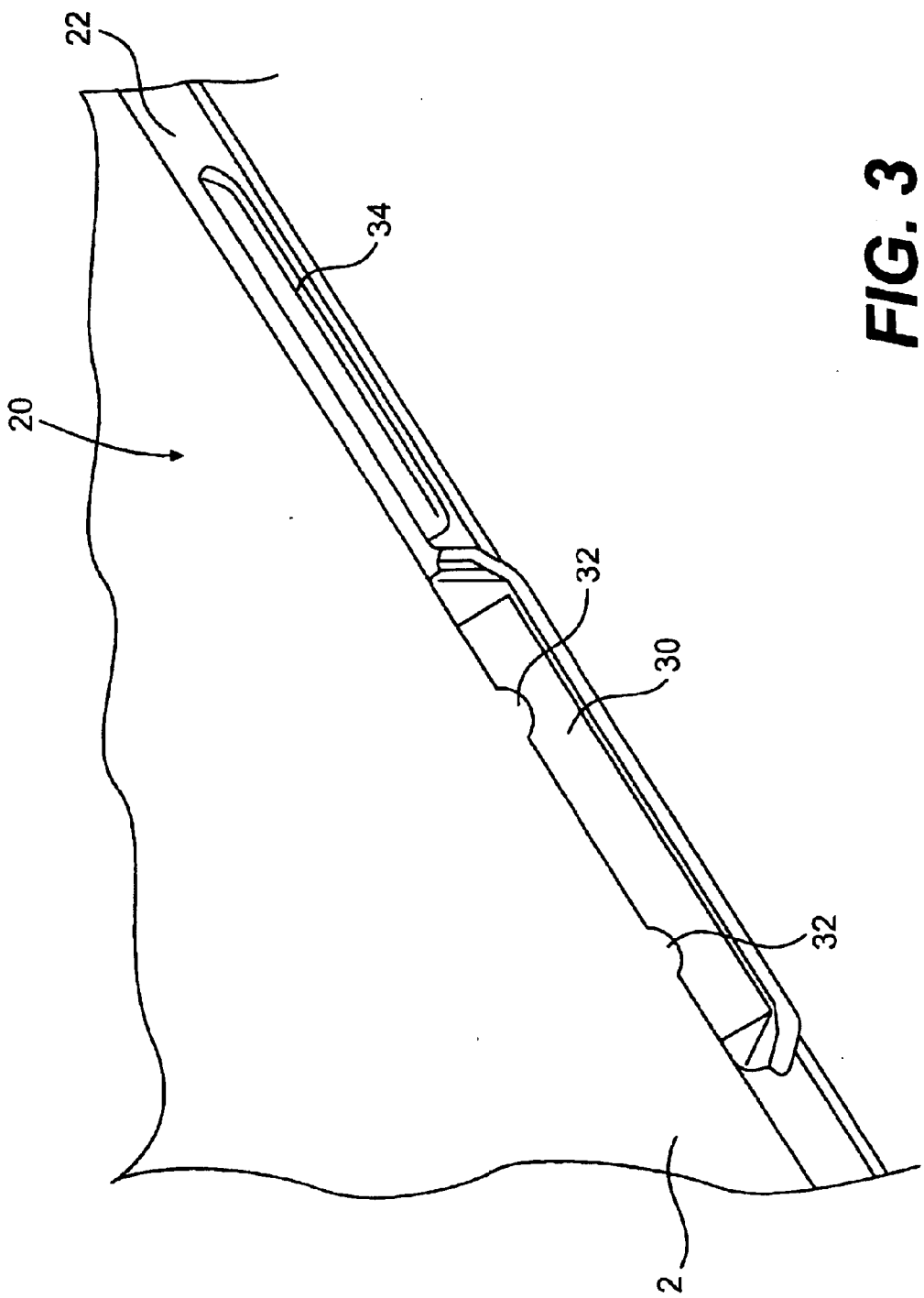
FIG. 3 is a fragmented, enlarged perspective view of the removable tray shown in FIG. 2.

Turning now to FIG. 3, the identification features of the tray 2 are shown in detail. As FIG. 3 illustrates, the tray is fabricated to be easily identifiable when supported in the chassis 14. To this end, the tray includes a label placement region 30 on each of its four sides. Each label placement region is formed as an integral cut-out on the outer surface of the sidewalls 18. The label placement region is planar and inclined to face upwardly. The exact dimensions and location of the label placement region may vary. However, as one of skill in the art will appreciate, the region should be of sufficient dimension to accept a label of practicable size. Further, each label placement region includes finger sized depressions 32 to facilitate both labeling and label removal.

The tray is also fabricated to include grooves 34 on the flange 22 on each side of the tray. The grooves are dimensioned to accept a color indicator such as a pigment or a decal and face upward from the flange. Like the label placement regions 30, the exact dimensions and location of the grooves may vary. However, as one of skill in the art will appreciate, the groove should be of a dimension sufficient to accept an appreciable amount of pigment or a practicably-sized label.

The tray 2 is preferably made of a polymeric material that is preferably compression molded, although other suitable materials such as steel and aluminum are also contemplated. In fact, myriad other materials that provide adequate rigidity, durability, and dimensional stability are possible. One such group of materials, the inventors have found particularly advantageous for applications involving electrical components, are those that are electrically dissipative, that is, having a tendency to disperse static electricity along the sidewalls 18 of the tray so as not to harm the components contained in the compartment. Also, the tray may be made in any suitable manner, such as by compression molding in the case of plastics or stamping in the case of metals. These manufacturing processes are well known in the art, and will not be described in further detail herein.

Figure 4:
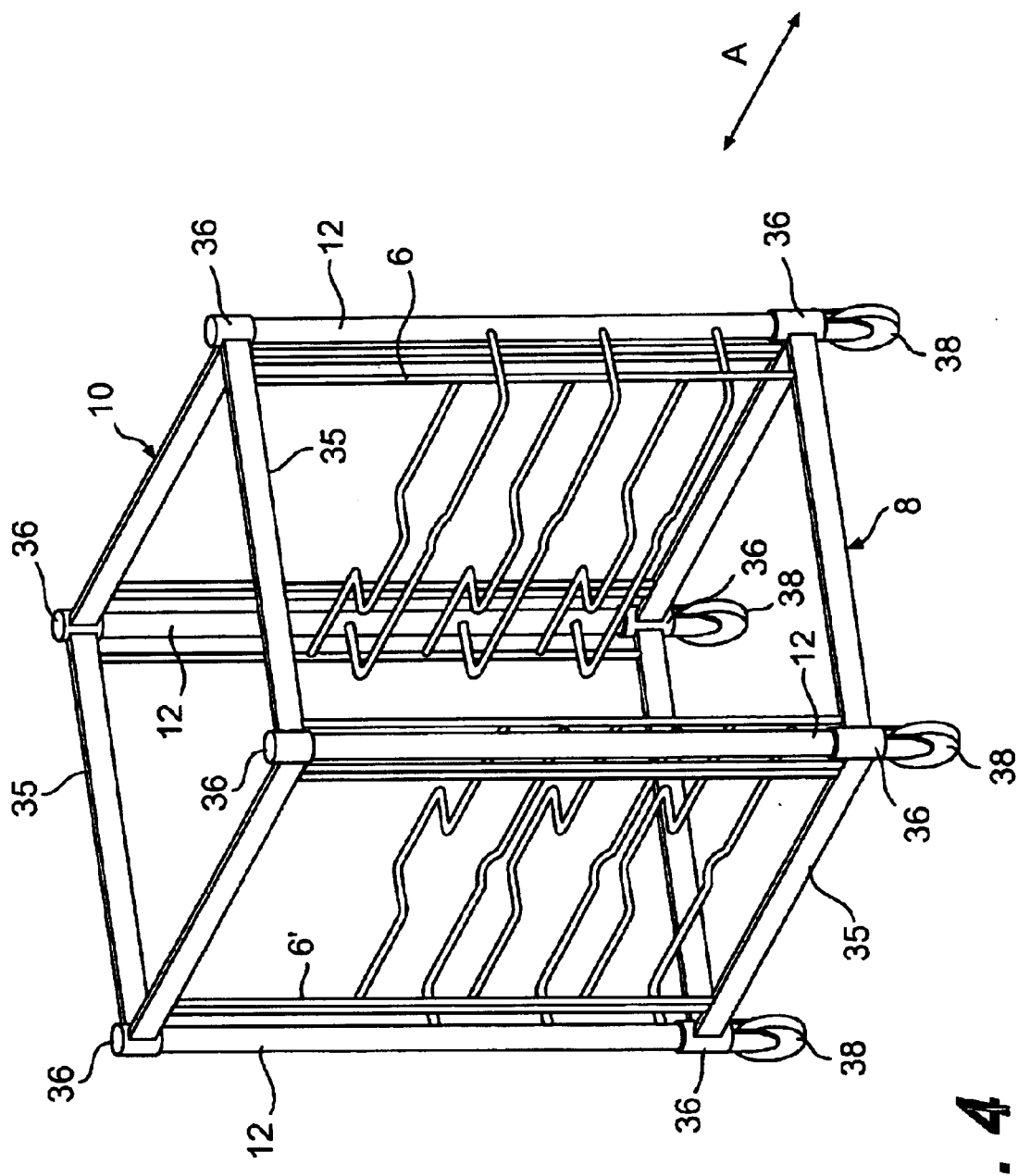
FIG. 4 is a left-side perspective view of the cart shown in FIG. 1.

FIG. 4 illustrates the chassis 14 of a preferred embodiment of the present invention as a cart viewed from a left-offset position outside of the front of the cart toward its interior. In the illustrated embodiment, both the base assembly 8 and the top assembly 10 are generally rectangular and have a relatively long dimension running along the left and right sides of the cart, and a relatively short dimension running along the front and back sides of the cart. The rectangular shape is advantageous since readily available, commercial trays are also generally rectangular in shape. While other shapes are possible, however, the use of such shapes would require the use of similarly shaped trays which are less common than rectangular trays. Additionally, the top assembly is preferably a wire or solid-surface shelf while the base assembly is an open frame.

The base and top assemblies 8, 10 are formed by trusses 35 spanning the length and width of the assemblies. The trusses provide the structural support and dimension for each of the assemblies and may take many forms including, for example, snake trusses, that is, trusses that employ a continuous snake-like rib between an upper and lower rib. Alternatively, a solid single structural member may be used.

Both the base and top assemblies 8, 10 include collars 36 at each corner. Each collar receives a sleeve that may be removably secured to a support post. If desired, casters 38 may be attached to the base assembly to facilitate positioning and/or transport of the cart.

Each of the four support posts 12 extends vertically upward from each collar 36 in the base assembly 8 to a collar 36 in the top assembly 10. The support posts provide the vertical dimension and structural rigidity for the cart 4. For a variety of reasons, it is desirable to have support posts of high strength and low weight. To that end, the support posts are typically hollow and are usually fabricated of metal. For example, the posts may be constructed of conductive, corrosion resistant metal, e.g., chrome-plated steel, that is easily cleaned. However, the support posts may be made of any conventional material which can be formed to define the above features, particularly plastics and polymers. Such alternative materials may be well suited to particular shelving system applications. Further, the support posts may be solid.

The cart infrastructure as provided by the base and top assemblies 8, 10, the support posts 12, and collars 36 can be of the knock-down type described in detail in U.S. Pat. Nos. 3,424,111, 3,523,506, 3,757,705 and 5,263,595, which are incorporated herein by reference.

As FIG. 4 shows, the rack 6 is disposed on one side of the cart 4, and the second opposing rack 6' is disposed in a mirror-image relationship on the opposite side of the cart. The trays (not shown in this figure) are removably supported on inwardly directed rungs between the racks and may be inserted and removed through the front or the rear of the cart.

As illustrated in FIG. 4, the cart 4 is adapted for front and rear "loading," that is, the removable trays may be inserted or removed from both the front and back sides of the cart as suggested by the bidirectional arrow "A". To effect such an arrangement, the racks 6, 6' are disposed so as to engage with the left and right sides of the base and top assemblies 8, 10 of the cart. Alternatively, the rack system also may be arranged as a "side loading" unit, that is to permit insertion and removal of the trays from the left and right sides of the cart. Such an arrangement would require that the racks 6, 6' be affixed to the front and rear of the bottom and the top assemblies of the cart, rather than to their sides. Further, as will be explained in detail below, when the tray is tipped, depending on whether the tray is inserted into the racks lengthwise or widthwise, either the first notches 24 or the second notches 26 will receive elbows of the rungs immediately above the trays while the other of either the first or second notches will receive connecting sections of the rungs.

Also, as illustrated in FIG. 4, the cart 4 is a frame assembly. This results in an "open" construction maximizing ventilation and viewability. However, it is to be understood that the cart may be constructed with solid panels on one or both of its non-loading sides. Furthermore, it is to be appreciated that while the chassis 14 described herein has been illustrated and described in the form of a cart, other chassis variations are possible. For example, the chassis may also take the form of a cabinet in which the racks are affixed to opposing cabinet sidewalls.

Figure 5:
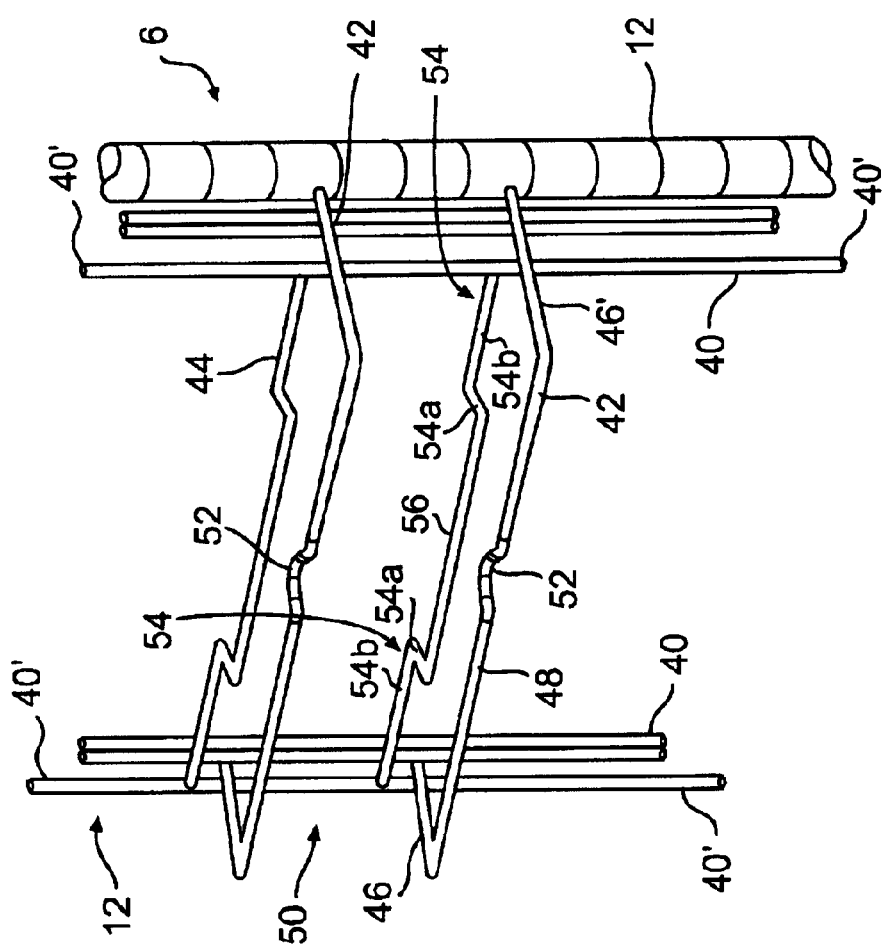
FIG. 5 is a fragmented, left-side perspective view of a rack including a plurality of horizontal support rungs, for use with the racking system shown in FIG. 1.

Referring to FIG. 5, there is illustrated a portion of the rack 6. Since the rack 6 is identical to the rack 6', only the former will be described. Also, it should be appreciated that since the rack 6 is identical to the rack 6' and is positioned in mirror-image relation to the rack, the view from the other side of the system is substantially identical.

The rack 6 is fabricated with at least one pair of vertically extending support rods 40 which provide the vertical dimension and structural rigidity for the rack. The illustrated embodiment uses three pairs of support rods. The rods extend beyond the vertical dimension of the rack and include end portions 40' that engage and interlock with the trusses 35 of the base and top assemblies 8, 10 thus joining the rack 6 to the chassis 12.

The rack 6 is fabricated to include a first plurality of vertically-spaced rungs 42 that extend laterally inwardly and a second plurality of vertically-spaced rungs 44 that also extend laterally inwardly. The first rungs support the trays, or the like between the two racks. The second rungs, in a manner described in detail below, limit lateral side-to-side movement of the trays supported on the first rungs. As best seen in FIGS. 5 and 6, the first and second rungs are alternatively spaced along the length of the support rods 40.

As FIG. 5 illustrates, each first rung 42 includes a pair of spaced apart legs 46, 46' and a longitudinally extending connecting section 48. The first rungs of the rack are in a mirror-image relationship with the first rungs of the rack on the opposite side of the cart and together support the tray from below.

The leg portions 46, 46' of the first rungs 42 are each mounted to one of the pair of vertical support rods 40 to hold them in their vertically-spaced horizontally-oriented positions. The connecting sections 48 of the first rungs include at least one elbow 52 extending laterally outward of the rack 6. The elbows are dimensioned and arranged to engage either the first or second notches 24, 26 of the sidewalls 18 when the flange 22 of the tray, in a manner discussed in detail below, is tilted so that the flange contacts the first rungs 42 immediately above the tray. Each connecting section 48 can be provided with a single elbow, preferably centrally located, or two or more elbows spaced along its length.

The vertical spaces between the first rungs form tray guides or "slides" 50. The slides have a vertical dimension greater than that of the tray. This vertical dimension allows the trays to tip in the racks 6, 6' while also providing "tilt-angle stops" that limit such tipping of the trays. In a manner discussed in detail below, this limited tipping allows the structure of the trays to passively stop lateral front-to-back movement of the trays within the racks. Additionally, the vertical dimension of the slides ensures that the contents of the compartment 20 are viewable from outside of the racks.

Still referring to FIG. 5, the second rungs 44, similar to the first rungs 42, are disposed in a mirror-image relationship with the second rungs of the opposing rack and cooperate therewith. Further, the vertical spacing of the second rungs is identical to that of the first rungs.

Each of the second rungs includes spaced apart legs 54, 54' and a connecting section 56. Each leg of the second rungs has a first section 54(a), 54(a)' that extends laterally outwardly and a second portion 54(b), 54(b)' that extends toward the support posts in a direction parallel to that of the connecting section. The first leg portions 54(a), 54(a)' are shorter than the legs 46, 46' of the first rungs 42. As illustrated, the connecting sections of the second rungs are shorter than the connecting sections 48 of the first rungs. Further, like the leg portions of the first rungs, the second leg portions of the second rungs are mounted to the vertical support rods 40 to hold them in their vertically-spaced horizontally-orientated position between the first rungs.

Figure 6:
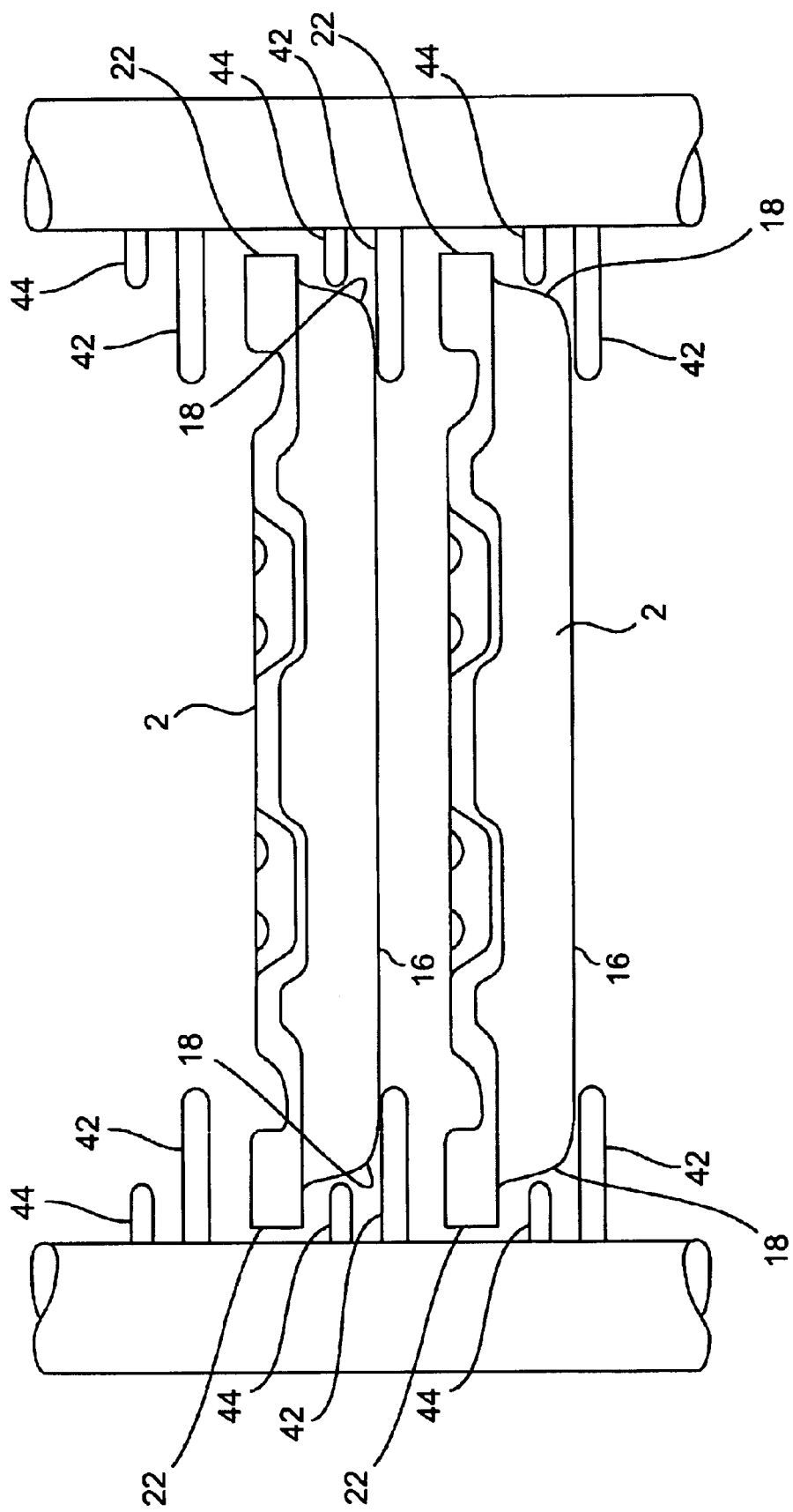
FIG. 6 is a fragmented schematic elevational view of the racks used in the racking system shown in FIG. 1 including a plurality of horizontal support brackets with several trays supported thereon.

Referring to FIG. 6, there is shown a plurality of trays 2 inserted into and supported by the racks 6 and 6'. As illustrated, the second rungs 44 are located in each tray slide 50 but in a vertical position below the flanges 22 of the inserted trays. Thus, they are disposed proximate to the sidewalls 18 of the trays.

The bottom surfaces 16 of the trays 2 rest primarily on the connecting sections 48 of each pair of first rungs 42. The sidewalls 18 of the trays are positioned opposite to the connecting sections 56 of each pair of second rungs 44. It is to be appreciated that the connecting sections of the first rungs of the racks support a plurality of trays in a vertically-spaced orientation while the second rungs limit the side-to-side lateral movement of the trays.

Resistance welding preferably may be used to attach the several components of the shelving system. Other forms of attaching the components may be used, such as oxyacetylene gas welding, brazing, and the like. However, resistance welding is fast and very strong, and results in smooth weld connections which are both aesthetically pleasing and safe to operators. Moreover, resistance welding is especially well suited to connect intersecting wire rods.

The operation of the tray and tray shelving system of the present invention is discussed with reference to FIG. 7. The tray 2 is shown in a tipped condition in which the notches 24, 26 are in contact with the first rung 42 immediately above the tray. As is illustrated in this embodiment, the tray has been drawn laterally outwardly such that a portion of the tray extends beyond the front of the cart, as when one desires to view or access the contents of the tray.

Figure 7:
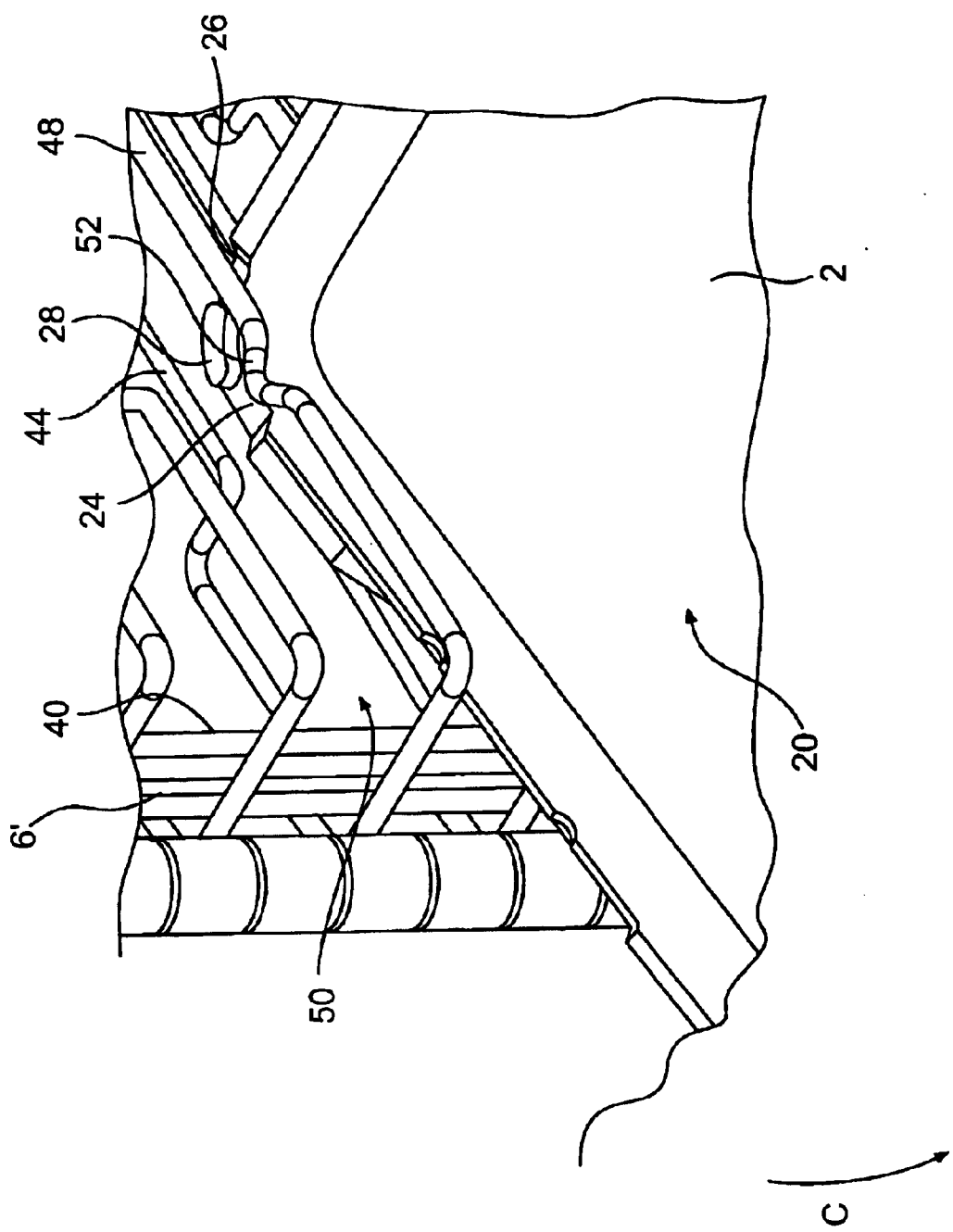
FIG. 7 is a fragmented perspective view of a partially withdrawn tray in the racking system shown in FIG. 1.

As the tray travels laterally out of the front of the cart to the position illustrated in FIG. 7, it slides on the first rungs 42 of the racks 6 and 6' on which it sits. In this condition, the portion of the tray that extends beyond the front of the racks is no longer supported by the first rungs. As a result, the weight of that portion of the tray, as well as that of any workpieces contained in that portion of the tray's compartment 20, tend to operate as a tipping force on the tray in the direction C with the front edges of the first rungs acting as a fulcrum about which the tray tends to pivot. Thus, in this condition, the tray tends to tip. This tendency to tip increases as the ratio of the unsupported weight of the tray and its load increases with respect to the weight supported by the first rungs. If drawn sufficiently far out and permitted to tip, the rear portion of the sidewall 18 will contact the connecting section 48 of the first rungs immediately above the tray.

When the rear of the tray is brought into contact with the first rungs 42 immediately above the tray, the second notches 26 at the rear of the tray receive the connecting sections 48 of the first rungs above the tray. As the tray continues to move laterally forward in a direction out of the cart, the first notches 24 receive the elbows 52 of the first rungs above the tray. As the first notches receive the elbows, the stops 28 engage the elbows preventing continued forward lateral movement of the tray. In this way the notches and the stops act as a passive stop to limit the lateral movement of the tray in the front-to-back direction.

To remove a tray from the cart, one draws the tray laterally forward while maintaining the tray's level horizontal orientation. By not allowing the tray to tip, the notches and the stop of the tray to do not engage the first plurality of rungs above the tray. Thus, the passive stop of the tray is not engaged.

It is to be appreciated that lateral movement of the tray during insertion, sliding movement, and removal is muted by the second rungs 44. Specifically, the second rungs are positioned in the slides 50 so that the flanges 22 of the sidewalls 18 of the trays 2 are disposed above the second rungs in the slide. Further, the second rungs are dimensioned to extend laterally less than the first rungs so that the connecting sections 56 of the second rungs are proximate to the left and right sidewalls of the tray. Thus, the lateral movement of the tray in the side-to-side direction is limited.

It will be appreciated that the present invention provides many improvements over known racking systems in that it is particularly well adapted to support trays in a convenient and readily accessible manner. Those having skill in this field will readily appreciate the economic advantages accruing to such a design.

Of course, all specific shapes and materials mentioned herein are provided by way of example only. Additionally, systems fabricated in other shapes and/or with materials other than those discussed herein also are contemplated. Further, although specific embodiments of the present invention have been described above in detail, it will be understood that this description is merely for purposes of explanation. Various modifications of and equivalent structures corresponding to the disclosed aspects of the preferred embodiments in addition to those described above may be made by those skilled in the art without departing from the spirit of the present invention which is defined in the following claims, the scope of which is to be accorded the broadest interpretation so as to encompass all such modifications and equivalent structures.

What is claimed is:

1. A tray comprising:
   a compartment having a bottom surface and perimeter sidewalls; and
   a passive stop arrangement provided in said compartment, said passive stop arrangement including at least a first notch in a first sidewall and a stop disposed proximate to said first notch, wherein
      said first notch has a vertical height lower than a vertical height of said first sidewall, and
      in said passive stop arrangement, a second notch is provided in a second sidewall transverse to said first sidewall, with said stop disposed between said first and second notches.

2. The tray of claim 1, wherein at least one of said first and second sidewalls has an identification surface.

3. The tray of claim 2, wherein said identification surface comprises an outwardly facing planar surface.

4. The tray of claim 3, wherein said identification surface is provided on the outer surface of at least one of said sidewalls.

5. The tray of claim 2, wherein said identification surface comprises an upwardly facing groove.

6. The tray of claim 5, wherein said identification surface is provided on an upper surface of at least one of said sidewalls.

7. The tray of claim 1, wherein said passive stop arrangement is provided at a corner of said compartment and allows said compartment to tilt.

8. A tray support system, the system comprising:
a chassis for supporting at least one removable tray, said chassis including at least two laterally-spaced and vertically oriented racks, said racks each having spaced rungs in a mirror-image relationship; and
at least one tray, said tray having perimeter sidewalls and a passive stop arrangement that allows said tray to tilt and engage said rungs, wherein
said passive stop arrangement includes at least a first notch in one of said sidewalls and a stop disposed proximate to said first notch, and
in said passive stop arrangement, said first notch is provided in a first sidewall and a second notch is provided in a second sidewall transverse to said first sidewall, with said stop disposed between said first and second notches.

9. The tray support system of claim 8, wherein said racks include a first plurality of rungs configured to support said at least one tray and limit the vertical movement thereof, and wherein said tray slides on one set of said first plurality of rungs and tilts to engage with a second set of said first plurality of rungs.

10. A tray support system, the system comprising:
a chassis for supporting at least one removable tray, said chassis including at least two laterally-spaced and vertically oriented racks, said racks each having spaced rungs in a mirror-image relationship; and
at least one tray, said tray having perimeter sidewalls and a passive stop arrangement that allows said tray to tilt and engage said rungs, wherein
said rungs include a first plurality of rungs configured to support said at least one tray and limit the vertical movement thereof, and wherein said tray slides on one set of said first plurality of rungs and tilts to engage with a second set of said first plurality of rungs, and
wherein said racks include a second plurality of rungs configured to limit lateral movement of said at least one tray.

11. A tray support system, the system comprising:
a chassis for supporting at least one removable tray, said chassis including at least two laterally-spaced and vertically oriented racks, said racks each having spaced rungs in a mirror-image relationship; and
at least one tray, said tray having perimeter sidewalls and a passive stop arrangement that allows said tray to tilt and engage said rungs,
wherein said racks includes a first plurality of rungs configured to support said at least one tray and limit the vertical movement thereof, and wherein said tray slides on one set of said first plurality of rungs and tilts to engage with a second set of said first plurality of rungs, and said first plurality of rungs has at least one laterally extending elbow arranged and configured to cooperate with said passive stop arrangement.

12. The tray support system of claim 8, wherein said passive stop arrangement is provided at a corner of said at least one tray.

13. The tray support system of claim 8, wherein said tray includes an identification surface.

14. The tray support system of claim 13, wherein said identification surface comprises an outwardly facing planar surface.

15. The tray support system of claim 14, wherein said identification surface is provided on the outside of at least one of said sidewalls.

16. The tray support system of claim 13, wherein said identification surface comprises a groove.

17. The tray support system of claim 16, wherein said identification surface is provided on an upper surface of at least one of said sidewalls.

18. The tray support system of claim 8, wherein said chassis further comprises wheels affixed thereto.

19. A sliding tray assembly adapted to be retained within a chassis, the chassis adapted for slidably receiving, supporting, and spacedly stacking a plurality of removable trays, one above the other between a pair of laterally-spaced and vertically-oriented racks, the racks including rungs, the tray assembly comprising:
a tray capable of supporting items; and
passive stop means for stopping sliding movement of said tray relative to the chassis, wherein
in said passive stop means, said first notch is provided in a first sidewall and a second notch is provided in a second sidewall transverse to said first sidewall, with said stop being disposed between said first and second notches, and
said passive stop means allow said tray to tilt to engage said first notch with the rungs.

20. The sliding tray assembly of claim 19, wherein said passive stop means is provided at a corner of said tray.

21. The sliding tray assembly of claim 19, wherein said tray includes identification means.

22. The sliding tray assembly of claim 21, wherein said identification means comprises an outwardly facing planar surface.

23. The sliding tray assembly of claim 22, wherein said identification means is provided on the outside of at least one of said first and second sidewalls.

24. The sliding tray assembly of claim 21, wherein said identification means comprises a groove.

25. The tray support system of claim 24, wherein said identification means is provided on the upper surface of at least one of said first and second sidewalls.

26. A tray support system, comprising:
a chassis having guide means to guide at least one tray at least partially disposed within said chassis, with said chassis receiving the tray in a tray sliding direction; and
a tray having passive stop means to stop movement of the tray in the tray sliding direction, wherein
said tray has perimeter sidewalls, and said passive stop means includes at least a first notch in one of said sidewalls and a stop disposed proximate to said first notch, and
in said passive stop means, said first notch is provided in a first sidewall and a second notch is provided in a second sidewall transverse to said first sidewall, with said stop means being disposed between said first and second notches.

27. The tray support system of claim 26, wherein said guide means comprises a pair of spaced-apart vertically-oriented racks.

28. The tray support system of claim 27, wherein each of said racks includes spaced rungs provided in a mirror-image relationship.

29. The tray support system of claim 28, wherein each of said racks includes a first plurality of rungs configured to support said tray and limit the vertical movement thereof.

30. A tray support system, comprising:
   a chassis having guide means to guide at least one tray at least partially disposed within said chassis, with said chassis receiving the tray in a tray sliding direction; and
   a tray having passive stop means to stop movement of the tray in the tray sliding direction, wherein
      said guide means comprises a pair of spaced-apart vertically-oriented racks, each of said racks including spaced rungs provided in a mirror-image relationship, and
      wherein each of said racks includes a first plurality of rungs configured to support said tray and a second plurality of rungs configured to limit lateral movement of said tray.

31. A tray support system, comprising:
   a chassis having guide means to guide at least one tray at least partially disposed within said chassis, with said chassis receiving the tray in a tray sliding direction; and
   a tray having passive stop means to stop movement of the tray in the tray sliding direction, wherein
      said guide means comprises a pair of spaced-apart vertically-oriented racks, each of said racks including spaced rungs provided in a mirror-image relationship,
      each of said racks includes a first plurality of rungs configured to support said tray and limit the vertical movement thereof, and
      wherein said first plurality of rungs include a laterally extending elbow arranged and configured to cooperate with said passive stop means.

32. The tray support system of claim 26, wherein said passive stop means is provided at a corner of said tray.

33. The tray support system of claim 26, wherein said tray further includes identification means.

34. The tray support system of claim 33, wherein said tray has perimeter sidewalls, and said identification means is provided on at least one of said first and second sidewalls.

35. The tray support device of claim 34, wherein said identification means comprises an outwardly facing planar surface.

36. The tray support system of claim 35, wherein said identification means is provided on an outside of at least one of said first and second sidewalls.

37. The tray support device of claim 33, wherein said identification means comprises an upwardly facing groove.

38. The tray support system of claim 32, wherein said identification means is provided on top of at least one of said first and second sidewalls.

39. The tray support system of claim 26, wherein said chassis further includes wheels affixed thereto.

40. A tray racking assembly adapted to slidably receive, support and spacedly stack a plurality of removable trays, said assembly comprising:
   a frame; and
   a pair of laterally spaced and vertically-oriented racks supported by said frame, with each rack comprising alternately spaced first and second distinct rungs, wherein said first rungs are adapted to support the tray from below and said second rungs are adapted to limit lateral movement of the tray, wherein one set of said first rungs supports a tray from below and a second set of said first rungs allows limited tilting of the tray.

41. A tray racking assembly according to claim 40, wherein each of said first rungs includes an elbow section disposed along its length.

42. A tray racking assembly according to claim 40, wherein each of said second rungs includes a length adapted to abut against the tray.

43. The tray support system of claim 11, wherein said racks include a second plurality of rungs configured to limit lateral movement of said at least one tray.

44. The tray support system of claim 31, wherein aid racks includes a second plurality of rungs configured to limit lateral movement of said trays.

* * * * *